(12) United States Patent
Libin

(10) Patent No.: US 12,328,530 B1
(45) Date of Patent: *Jun. 10, 2025

(54) ANCHORS AND INTERACTIVE FORMS FOR ASYNCHRONOUS VIDEO PRESENTATIONS WITH IMMERSIVE VIEWERS

(71) Applicant: mmhmm inc., Little Rock, AR (US)

(72) Inventor: Phil Libin, San Francisco, CA (US)

(73) Assignee: mmhmm inc., Bentonville, AR (US)

( * ) Notice: Subject to any disclaimer, the term of this patent is extended or adjusted under 35 U.S.C. 154(b) by 379 days.

This patent is subject to a terminal disclaimer.

(21) Appl. No.: 18/112,105

(22) Filed: Feb. 21, 2023

Related U.S. Application Data

(63) Continuation-in-part of application No. 17/967,953, filed on Oct. 18, 2022, now Pat. No. 11,778,143, which is a continuation of application No. 17/402,787, filed on Aug. 16, 2021, now Pat. No. 11,539,918.

(60) Provisional application No. 63/077,872, filed on Sep. 14, 2020.

(51) Int. Cl.
| | |
|---|---|
| *H04N 7/15* | (2006.01) |
| *G06F 3/04845* | (2022.01) |
| *G06F 3/0487* | (2013.01) |
| *H04L 12/18* | (2006.01) |
| *H04L 65/403* | (2022.01) |

(52) U.S. Cl.
CPC ........... *H04N 7/15* (2013.01); *G06F 3/04845* (2013.01); *G06F 3/0487* (2013.01); *H04L 12/1822* (2013.01); *H04L 65/403* (2013.01)

(58) Field of Classification Search
CPC ..... H04N 7/15; G06F 3/04845; G06F 3/0487; H04L 12/1822; H04L 65/403
See application file for complete search history.

(56) References Cited

U.S. PATENT DOCUMENTS

| | | | |
|---|---|---|---|
| 8,739,234 B1* | 5/2014 | Cheung | ................... H04L 65/00 725/35 |
| 9,942,519 B1* | 4/2018 | Pan | ........................ H04N 21/47 |
| 10,332,074 B1* | 6/2019 | Gallagher | ............. H04L 65/403 |
| 11,432,047 B1* | 8/2022 | Panchaksharaiah | .. H04L 51/046 |
| 2014/0006974 A1* | 1/2014 | Bell | .................... H04L 12/1822 715/753 |

(Continued)

*Primary Examiner* — Nicholas T Corbo
(74) *Attorney, Agent, or Firm* — Westborough IP Group, LLC

(57) ABSTRACT

Manipulating an image in a combined immersive video space for a replayed pre-recorded video being displayed to a plurality of participants includes associating an anchor to a background of the combined immersive video space, static interior objects in the combined immersive video space, and/or dynamic interior objects in the combined immersive video space, providing an image corresponding to an original presenter in the pre-recorded video, an object in the combined immersive video space, and/or one of the participants that is viewing pre-recorded video, and actuating an anchor activation control that causes the image to move to a position of the anchor while other ones of the participants are viewing the pre-recorded video. The image may move to the position of the anchor along a transitional route and may change appearance as the image moves. The position of the anchor may be preset before replaying the pre-recorded video.

18 Claims, 9 Drawing Sheets

(56) References Cited

U.S. PATENT DOCUMENTS

2018/0239504 A1\* 8/2018 Huang .................. H04L 65/611
2022/0083197 A1\* 3/2022 Rockel .................. G06T 19/006

\* cited by examiner

ANCHORS AND INTERACTIVE FORMS FOR ASYNCHRONOUS VIDEO PRESENTATIONS WITH IMMERSIVE VIEWERS

CROSS-REFERENCE TO RELATED APPLICATIONS

This application is a continuation-in-part of U.S. patent application Ser. No. 17/967,953, filed on Oct. 18, 2022, and entitled "INTERACTIVE OBJECTS, ANCHORS AND IMAGE SEARCH FOR IMMERSIVE CONFERENCE SPACES WITH SHARED VIRTUAL CHANNELS", which is a continuation of U.S. Pat. No. 11,539,918, which issued on Dec. 27, 2022, and is entitled "INTERACTIVE OBJECTS, ANCHORS AND IMAGE SEARCH FOR IMMERSIVE CONFERENCE SPACES WITH SHARED VIRTUAL CHANNELS", which claims priority to U.S. Prov. App. No. 63/077,872, filed on Sep. 14, 2020, and entitled "INTERACTIVE OBJECTS, ANCHORS AND IMAGE SEARCH FOR IMMERSIVE CONFERENCE SPACES WITH SHARED VIRTUAL CHANNELS", all of which are incorporated herein by reference.

TECHNICAL FIELD

This application is directed to the field of information processing and video recording, and more specifically to the field of setting up and manipulating with anchors and interactive objects, including forms and questionaries for asynchronous video presentations with immersive viewers.

BACKGROUND OF THE INVENTION

Video content has emerged as a dominant productivity, educational and entertainment medium for the contemporary business and homes with business applications that include professional training, education, e-commerce, marketing, product development and support, business communications and presentations, hiring and onboarding, consulting, etc. According to market research, the size of global enterprise video market will grow from $33 billion in 2020 to $49 billion by 2030, with its largest segment representing marketing and sales in Banking, Financial Services and Insurance.

An average person spends about 100 minutes per day watching online video content. In particular, 95% of Internet users watch product and service illustrations in the form of explainer videos; polls show that 84% of the watchers made purchase decision after learning product and service features from such videos. It is estimated that viewers can retain about 95% of the information found in a video content compared to just 10% information after consuming textual information.

Public, group, and enterprise video repositories may store video content in multiple formats, provide hosting, authoring, editing, and sharing options, content categorization and tagging, authoring and usage analytics, social features, etc. Such repositories may include libraries of reusable video content for content creators and commenters. Notable examples of dedicated video repositories and platforms for public online video streaming include YouTube, Twitch, Aparat, IQiyi, Vimeo, Youku. General sites and social networks, such as Facebook, Tencent, Sina Weibo, Instagram, Twitter. Brightcove, DaCast, Dailymotion Cloud may offer video hosting among their features, while online video editing services Animoto, Clesh, Dailymotion, Blackbird, etc. have emerged as popular video hosting providers for businesses.

With the rise of a geographically dispersed workforce and the proliferation of remote and distributed work style, the asynchronous content created by employees and consumed by individual co-workers and teams through enterprise video repositories, such as mmhmm TV channels, is augmenting and gradually replacing in-person meeting and video conferencing. Such enterprise video content repositories allow video sharing and streaming among employees, existing and prospective customers, partners, and other relevant parties, without a need for content authors to present their work in front of the viewers in live physical meetings and video conferences. In other words, creation of video content is increasingly separated and from other forms of synchronous communications between the content author and the content viewers.

One of the mechanisms of collective video sharing, a Watch Party, has evolved independently from the formation of video content repositories. A watch party was initially defined as a social gathering for the purpose of watching a specific event or program on television. Advanced watch party applications, such as collective watching features associated with specific video content providers (Netflix, Hulu, Amazon Prime, Disney+ GroupWatch, TikTok, Instagram) or provided by third-party aggregator apps that allow viewing different content sources and services (Scener, TeleParty, Kast), include a variety of features, for example, initiation of a party by an organizer, switching between supported video sources (services, repositories), selection methods for the video to watch, playback control, different types of communication between the party participants, such as text, voice, or video chat, etc.

A new generation of asynchronous video content and watch party applications uses immersive technologies and software, such as the mmhmm application developed by mmhmm inc. New capabilities include an AR component, where each participant may join a watch party individually (for example, from the participant's home) and may be represented not only by a chosen avatar but also by a real-time image of each participant, captured by a front-facing camera on a mobile or a desktop device, segmented from the video stream and superimposed upon the meeting party environment. The asynchronous content of the pre-recorded video presentation may also be immersive. The participants of a watch party may jointly choose one or several watching spaces, such as halls, lawns, pools, parks, or abstract structures and backdrops, and the target asynchronous video may be played in a virtual channel located anywhere in the watching space.

SUMMARY OF THE INVENTION

The emergence of immersive video presentations and watch parties with physically separated participants and embedded virtual dynamic objects presents significant challenges in many areas, including the control of presenter and user positioning and movements in the immersive spaces, capturing user feedback, and real-time modification of presentation agendas following such feedback, etc.

Accordingly, it is important to develop techniques and systems for advanced control of positioning of an asynchronous presenter and watch party participants in their corresponding immersive virtual spaces, capturing and processing participant feedback, and additional immersive capabilities of the hybrid asynchronous/synchronous watch party and presentation space.

According to the system described herein, manipulating an image in a combined immersive video space for a replayed pre-recorded video being displayed to a plurality of participants includes associating an anchor to a background of the combined immersive video space, static interior objects in the combined immersive video space, and/or dynamic interior objects in the combined immersive video space, providing an image corresponding to an original presenter in the pre-recorded video, an object in the combined immersive video space, and/or one of the participants that is viewing pre-recorded video, and actuating an anchor activation control that causes the image to move to a position of the anchor while other ones of the participants are viewing the pre-recorded video. The image may move to the position of the anchor along a transitional route. The image may change appearance as the image moves to the position of the anchor along the transitional route. The position of the anchor may be preset before replaying the pre-recorded video. The position of the anchor may be created on the fly during replaying the pre-recorded video. At least one of the participants may actuate the anchor activation control. The at least one of the participants may actuate the anchor activation control using a keyboard shortcut, a click, a voice command, and/or a touch gesture. The touch gesture may be a tap, a swipe, a tap and hold and/or an encircling of the anchor. The original presenter in the pre-recorded video may be moved in response to actuating the anchor activation control. At least some of the participants may be present in the combined immersive video space. Manipulating an image in a combined immersive video space for a replayed pre-recorded video being displayed to a plurality of participants may also include displaying a form via a display pane of a shared virtual channel that is used to provide the pre-recorded video, requesting that the participants fill out the form to generate a plurality of completed forms, and adjusting portions of the pre-recorded video that are displayed to the participants based on information provided on the completed forms. A presenter may request that at least a subset of the participants fill out the form. A particular one of the participants may become a co-presenter for the pre-recorded video and may provide comments to the form and/or at least one of the completed forms. The particular one of the participants may stop the pre-recorded video prior to providing comments. A summary of form processing activity may be displayed to the participants. Information in the completed forms may be used to build and/or create at least one of profiles of the participants and preferences of the participants.

According further to the system described herein, a non-transitory computer readable medium contains software that manipulates an image in a combined immersive video space for a replayed pre-recorded video being displayed to a plurality of participants. The software includes executable code that associates an anchor to a background of the combined immersive video space, static interior objects in the combined immersive video space, and/or dynamic interior objects in the combined immersive video space, executable code that provides an image corresponding to an original presenter in the pre-recorded video, an object in the combined immersive video space, and/or one of the participants that is viewing pre-recorded video, and executable code that actuates an anchor activation control that causes the image to move to a position of the anchor while other ones of the participants are viewing the pre-recorded video. The image may move to the position of the anchor along a transitional route. The image may change appearance as the image moves to the position of the anchor along the transitional route. The position of the anchor may be preset before replaying the pre-recorded video. The position of the anchor may be created on the fly during replaying the pre-recorded video. At least one of the participants may actuate the anchor activation control. The at least one of the participants may actuate the anchor activation control using a keyboard shortcut, a click, a voice command, and/or a touch gesture. The touch gesture may be a tap, a swipe, a tap and hold and/or an encircling of the anchor. The original presenter in the pre-recorded video may be moved in response to actuating the anchor activation control. At least some of the participants may be present in the combined immersive video space. The software may also include executable code that displays a form via a display pane of a shared virtual channel that is used to provide the pre-recorded video, executable code that requests that the participants fill out the form to generate a plurality of completed forms, and executable code that adjusts portions of the pre-recorded video that are displayed to the participants based on information provided on the completed forms. A presenter may request that at least a subset of the participants fill out the form. A particular one of the participants may become a co-presenter for the pre-recorded video and may provide comments to the form and/or at least one of the completed forms. The particular one of the participants may stop the pre-recorded video prior to providing comments. A summary of form processing activity may be displayed to the participants. Information in the completed forms may be used to build and/or create at least one of profiles of the participants and preferences of the participants.

The proposed system enhances creation of immersive video content and watch party features for asynchronous presentations based on individual presentation spaces with shared virtual channels, as described in U.S. Pat. No. 11,317,060 by Phil Libin titled: "INDIVIDUAL VIDEO CONFERENCING SPACES WITH SHARED VIRTUAL CHANNELS AND IMMERSIVE USERS", issued on Apr. 26, 2022, and incorporated by reference herein. The enhancements include preset or dynamically created anchors for precise positioning of presenters, watch party participants and other dynamic objects, and inline completion and processing of interactive forms, questionnaires and other content introduced via shared virtual channels and potentially affecting the course of a presentation for a watch party. Various aspects of system functioning are explained as follows.

1. Interactive asynchronous video content and hybrid immersion. In the watch party environment, participants watch asynchronous pre-recorded video content. The asynchronous video content may be an immersive presentation where the presenter may be using various presentation materials, such as slides, opened in virtual channels of a presentation space. The video is replayed in another immersive virtual space, a watch party space. Accordingly, the immersive presentation space and the watch party space may be overlaid, at least partially, on each other to form a combined immersive video space. The replayed pre-recorded content may not be completely passive: the replayed pre-recorded content may possess multiple interactive features, providing watch party members (participants) with the ability to interact with the asynchronous video content. Thus, live participants who are already immersed into the watch party environment may be further immersed into the pre-recorded video, in parallel with the continuous presentation or by stopping the presentation, muting, or moving the presenter of the pre-recorded presentation. This feature may be called a hybrid immersion. Other interactive and immersive features of asynchronous presentations within a watch party environment are explained elsewhere herein.
2. Anchors for dynamic objects. Dynamic objects associated with a visual environment of both a presentation and a watch party may include anchors attached to the background of the environment, to static or dynamic interior objects in the conference or the watch party space or to the content of shared virtual channels in the presentation space.

Anchors may possess several attributes and features explained below:
- A source, typically a presenter, a viewer (watch party member/participant) or another dynamic object.
- A destination, such as a location within an environment background, an object within a conference or a watch party space or an area within the display pane of a virtual channel opened by the presenter;
- An appearance, including shape, size, transparency, color, and other features of the source when it is aligned with the anchor destination;
- A transition route, such as an instant snap of the source to the anchor's destination position or a transitional path, possibly including morphing of visual characteristics of the source from its start appearance to its appearance at the destination (if these appearances differ) or other dynamic indicator of the path, for example, displaying the trace without showing the source object; and
- An anchor activation control, which may be a keyboard shortcut, a touch gesture (tap, swipe, tap and hold) or other command, as well as some combinations of the above. The control may also include parameters that indicate choices between various options of anchor features.

Invoking an anchor via an activation control causes the source to reposition to a destination of the source along a transition route. The source may change appearance while moving along the transition route. Destinations may be defined by absolute or relative coordinates or other references within the individual conference space and/or shared virtual channels.

Anchors may be preset before the start of a video conference or a recorded presentation or may be created on the fly, during the presentation by the presenter or other authorized participants. Anchor positions may be highlighted on a screen of the presenter for easy operation. Anchors may also be deleted by the presenter or by other authorized participants.

Anchor examples may include:
a. Snapping a presenter or participant to a specific location on a background of a conference space, for example, putting the presenter at a table in a historical room or within a key scene in a movie;
b. Moving a virtual instrument (e.g., a screwdriver) to a start position during an instructional presentation on a furniture assembly;
c. Positioning a presenter or participant near a predefined area on a slide displayed in a shared virtual channel before starting a voice explanation of content of the slide. Thus, if the presenter or participant is explaining a worksheet, anchors may be placed on top of several columns of the worksheet, so an image of the presenter or participant (properly resized) appears on top of a column simultaneously with the start of discussion of data of the column.
d. A member of a watch party (participant) may preset or dynamically set anchors in the watch party environment to control movement of a member/participant during the watch party. The member may also set anchors in the asynchronous video content and immerse the member/participant into the video content using the defined anchors to quickly move to predefined positions within the presentation space visualized in the asynchronous video replay. Analogously, members/participants of the watch party may use anchors in the watch party environment (without necessarily referring to the asynchronous presentation).
3. Interactive forms and questionnaires. Interactive objects associated with the channel content in an asynchronous immersive presentation may include forms, quizzes, inline tests, polls, tasks, and other types of interactive content soliciting audience feedback. In a synchronous situation, such as a video conference, the forms may be instantly completed by the audience, instantly processed and summarized, and may affect the flow of a conference. Additionally, participants may be invited by a presenter and immersed into a conference or presentation space to comment on the forms and on responses by the participants and to provide recommendations to other participants and/or to the presenter, etc.

Under the conditions of a watch party with an asynchronous video content replayed in the watch party environment, the presenter in the asynchronous video content cannot communicate directly with the members of the watch party (participants). However, there still exist significant opportunities for deferred interaction (deferred compared with the time of creation of the asynchronous video content) between the presentation and the watch party:
(i) An interactive form may still be displayed within the presentation pane (a virtual channel).
(ii) The presenter may explain the purpose of the form and invite the audience to complete the form (in principle, such an invitation does not necessarily depend on whether the presenter communicates synchronously with participants of a video conference or talks to unknown future viewers of the presentation).
(iii) An add-on interactive software component, attached to the player or content of the asynchronous video content, may enable completing the form by members of a watch party (participants). Such add-on software components may also process and analyze the completed forms and build user profiles and preferences.
(iv) One of the outcomes of such form processing may be altering the course of the asynchronous presentation if alternative routes have been already provided for in the asynchronous video content and may be switched by the add-on software based on content of the forms.
(v) Additionally, a summary of form processing activity may be displayed in such hybrid interactive video content. Subsequently, a member of a watch party (participant) may be immersed into the hybrid video content and may comment for other watch party members (participants) on the original form and on the processing results.

BRIEF DESCRIPTION OF THE DRAWINGS

Embodiments of the system described herein will now be explained in more detail in accordance with the figures of the drawings, which are briefly described as follows.

DETAILED DESCRIPTION OF VARIOUS EMBODIMENTS

The system described herein provides a mechanism for presetting or dynamically creating anchors for precise positioning of presenters, immersive watch party members (participants), and other dynamic objects for asynchronous immersive video content viewed by members of a watch party (participants), and for inline completion and processing by members of a watch party (participants) of interactive forms, questionnaires and other content introduced by an asynchronous immersive video presentation viewed by the member of a watch party (participant).

Figure 1:
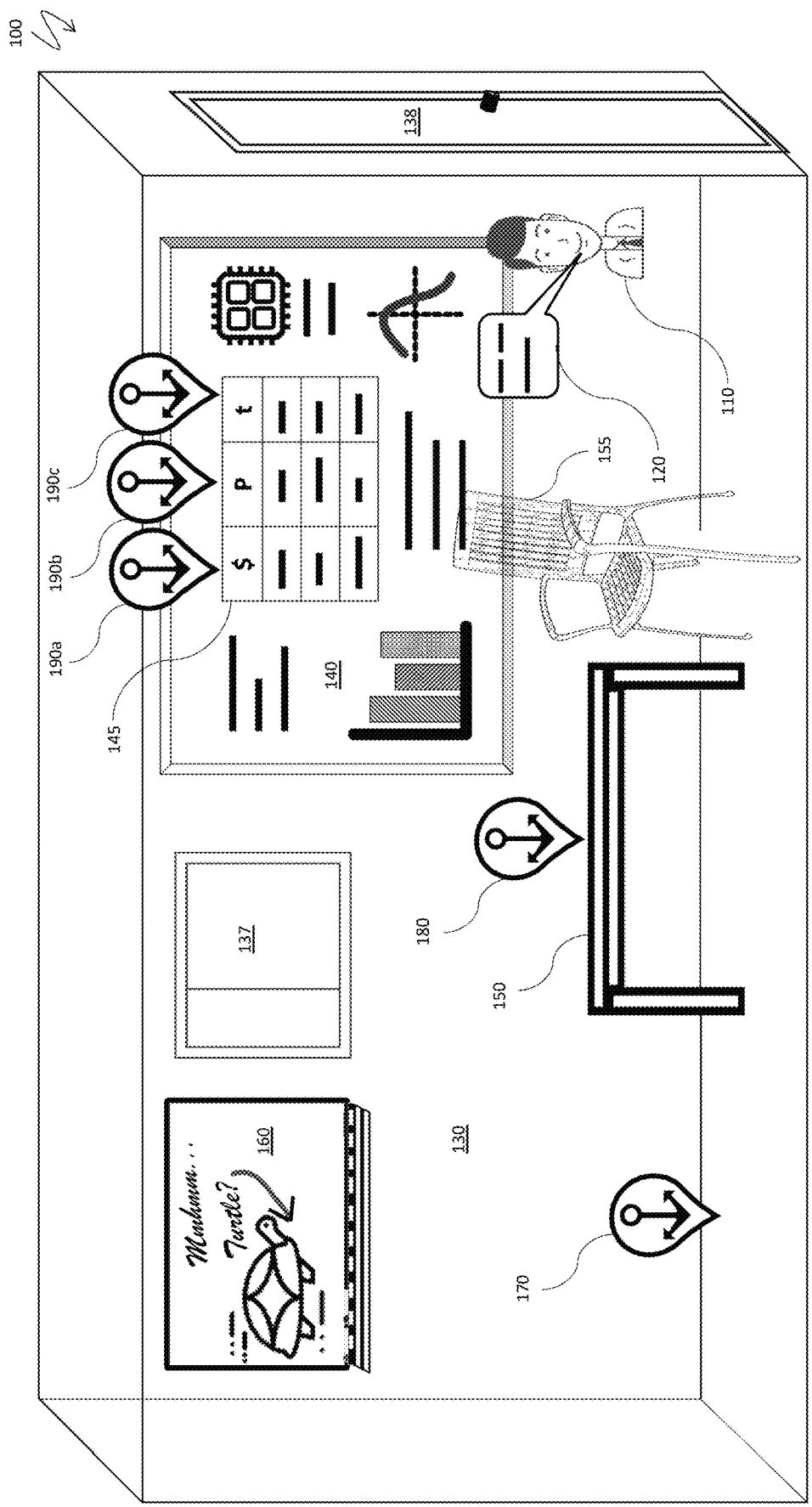
FIG. 1 is a schematic illustration of setting up anchors in a virtual presentation room and channel prior to a recording of an asynchronous video by a presenter, according to an embodiment of the system described herein.

FIG. 1 is a schematic illustration 100 of setting up anchors in a virtual presentation room prior to a recording of an asynchronous video by a presenter 110. The presenter 110 gives an asynchronous talk 120 in an immersive presentation space (room) 130 based on content of a shared virtual channel 140; the content includes, among other materials, a three-column table 145. The virtual channel 140 is opened on a wall of the immersive conference space 130, which may be a physical space where the presenter 110 resides, may include virtual components, such as the shared virtual channel 140, or may be a fully emulated virtual environment where the image of the presenter 110 is immersive, as explained elsewhere herein. The immersive conference space 130 has a window 137, a door 138, two pieces of furniture 150, 155, and a physical whiteboard 160.

Prior to the start of a video conference and/or a pre-recorded video presentation, the presenter 110 or other person, such as a conference organizer or an assistant of the presenter 110, may set up several anchors associated with different objects used during the presentation: an anchor 170 associated with the whiteboard 160, an anchor 180 associated with the desk 150, and three anchors 190a, 190b, 190c associated with the three columns of the table 145. Each of the anchors 170, 180, 190a-190c may have a list of attributes, explained elsewhere herein (see bullet point 1 in the Summary section).

Figure 2:
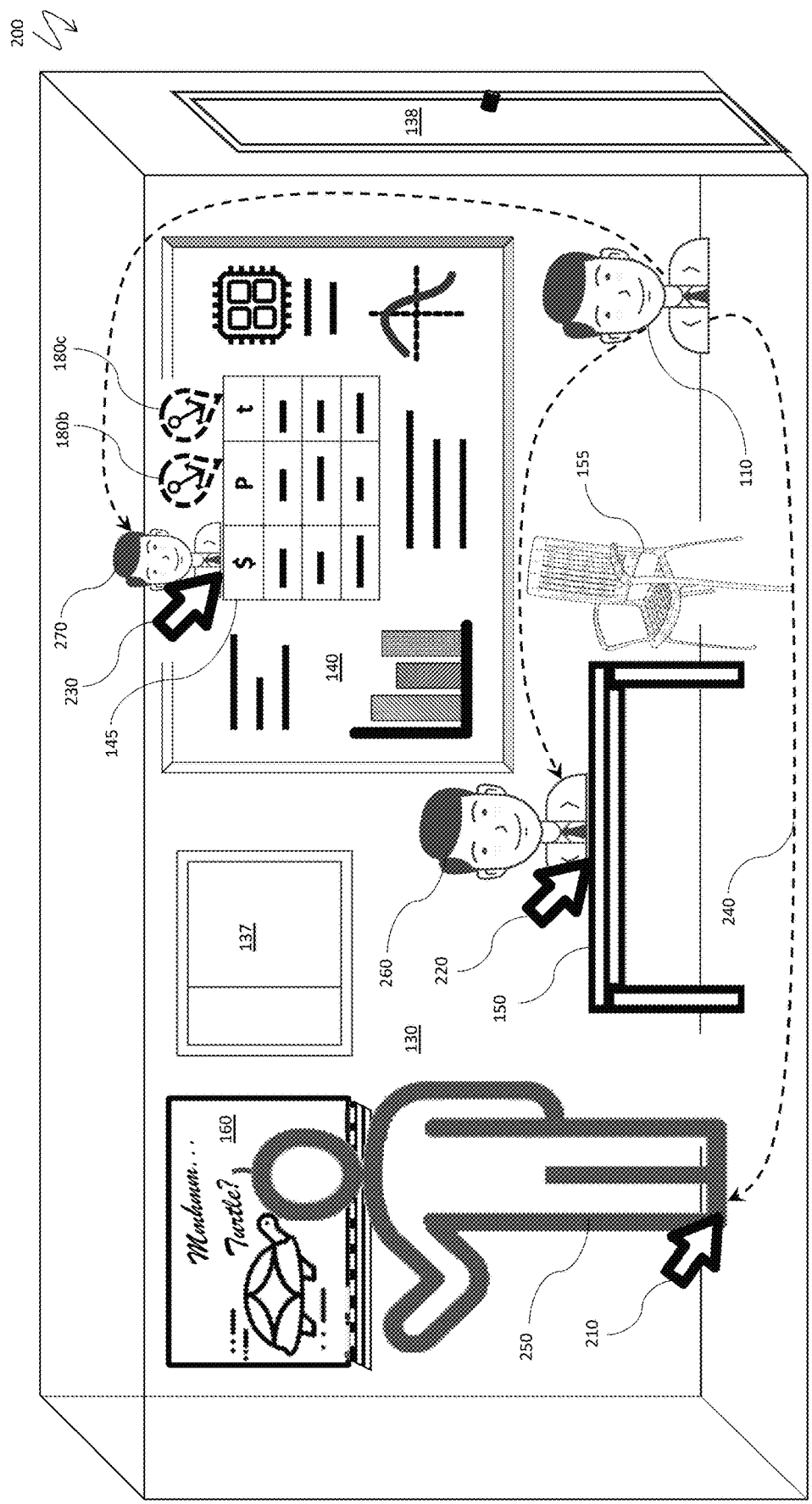
FIG. 2 is a schematic illustration of anchor activation, repositioning and transforming of a presenter image during a recording of an asynchronous video by a presenter, according to an embodiment of the system described herein.

FIG. 2 is a schematic illustration 200 of anchor activation, repositioning and transforming of a presenter image during a recording of an asynchronous pre-recorded video by the presenter 110. Analogously to FIG. 1, the presenter 110 discusses the content of the shared virtual channel 140 having the three-column table 145 and draws on the whiteboard 160, residing in the immersive presentation space 130 with the window 137, the door 138 and the furniture 150, 155.

When the presenter 110, during the talk of the presenter 110, activates an anchor using a click, a touch gesture or other method, an image of the presenter 110 is instantly repositioned from a previous location, snapped at a position of the anchor, and assumes an appearance designed for the anchor, as explained elsewhere herein. FIG. 2 includes several examples of anchor activation and the accompanying changes:

When the presenter 110 activates the anchor 170 from FIG. 1 (not displayed in FIG. 2) by making an activation gesture 210 (shown in FIG. 2 as a point-and-click gesture but may be a swipe, an encircling of the anchor or any other gesture or control, such as a voice command), the image of the presenter 110 moves from an original position near the shared virtual channel to an anchor location at the whiteboard 160, as illustrated by a dashed arrow 240. Relocation may be instant or may be accompanied by various effects, including different types of animation, for example, morphing of an image of the presenter 110 from an original appearance to a standing posture 250 at the whiteboard 160. An example of application of such anchor activity could be an earlier pre-recorded video clip of a presentation where the presenter 110 was drawing on the whiteboard 160; by activating the anchor, the presenter 110 may relocate the image of the presenter 110 to the whiteboard 160 and start a replay of the pre-recorded video clip.

When the presenter 110 activates the anchor 180 from FIG. 1 (not displayed in FIG. 2) with a gesture 220, a new position 260 of the presenter 110, without resizing, emulates the presenter 110 sitting at the desk 150 and continuing the presentation, which may be useful when a fragment of a talk of the presenter 110 is directed to the future audience (watch party members/participants) and is not related to content of the shared virtual channel 130; in fact, the channel 130 may even be automatically minimized or temporarily closed in conjunction with the activation gesture 220, which switches the attention of the audience to a central position 260 of the presenter 110 in the conference space 130.

In contrast with the previous case, activating the anchor 290a (not displayed in FIG. 2) with a gesture 230 attracts the attention of the audience to details of the content presented in the virtual channel 130—specifically, to the left column of the table 145. An image of the presenter 110 is shown resized to align with the presented material. Once the presenter 110 completes explanations for the left column of the table 145, the next anchor 190b may be activated analogously; alternatively, pressing right and left arrow keys (possibly in combination with some modifying keys) may navigate the image of the presenter 110 between the three columns of the table 145 to shift the focus of attention during explanations by the presenter 110.

Figure 3A:
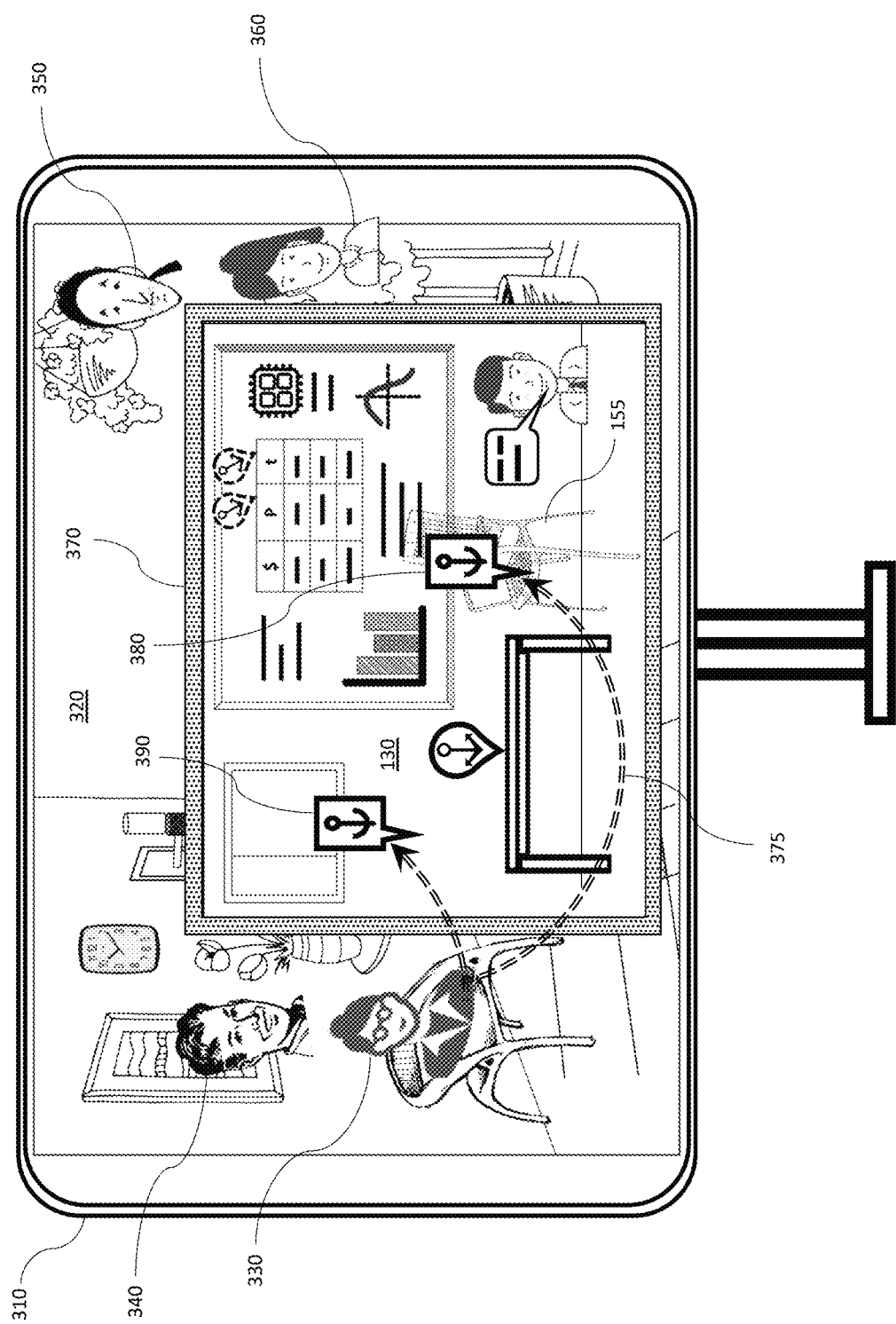
FIGS. 3A-3B are schematic illustrations of setting up and activating anchors in a virtual presentation room by an immersive watch party member (participant), according to an embodiment of the system described herein.
Figure 3B:
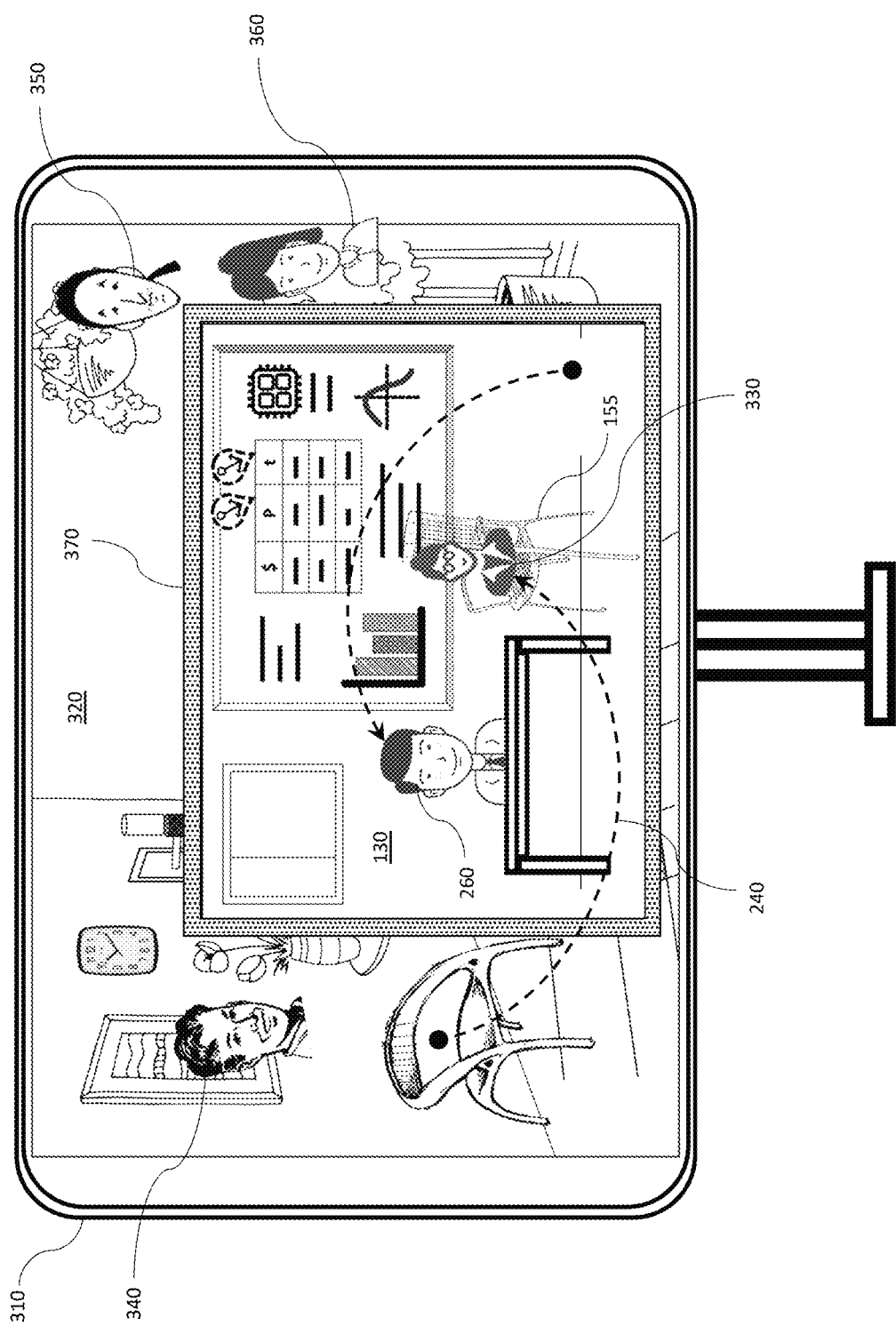

FIGS. 3A-3B are schematic illustrations of setting up and activating anchors in a virtual presentation room by an immersive watch party member (participant).

In FIG. 3A, a screen 310 shows a physical or virtual watch party space 320 accommodating four immersive watch party members 330, 340, 350, 360 (participants) that are viewing an asynchronous video content replayed on a pane 370 placed within the watch party space 320 and reproducing a presentation within the immersive presentation space 130 (see FIG. 1 for more information). Immersive properties of the presentation space 130 extend to the watch party members 330, 340, 350, 360, adding another immersive dimension and allowing the members 330, 340, 350, 360 to become, with certain limitations, an immersive part of the presentation. The immersive presentation space 130 and the watch party space 320 together form a combined immersive video space.

In FIG. 3A, the watch party member 330 presets two anchors 380, 390 (as illustrated by a double arrow 375) with the purpose of facilitating future navigation of the member 330 within the immersive presentation space 130 using, for example, an activation gesture similar to the activation gesture that is used by the presenter 110, which is described in detail elsewhere herein. Transitions of the members 330, 340, 350, 360 with respect to the anchors 380, 390 may be similar to transitions of the presenter 110, described elsewhere herein. Note that anchor appearance (shape and symbol) is intentionally made different from the anchors originally installed by the presenter 110 in the pre-recorded asynchronous content to distinguish the presenter 110 from watch party members (participants) who may view the presentation at different times, physical locations and watch party environments.

FIG. 3B is a schematic illustration of activation of an anchor set up by a watch party member (participant). Under the same notations as in FIG. 3A, where a virtual watch party environment is used by four immersive watch party members 330, 340, 350, 360 to view an asynchronous video content within the pane 370 replaying a presentation within the immersive presentation space 130, the watch party member 330 activates the anchor 380 (not shown in FIG. 3B) and is immediately immersed into the presentation space 130, where the member 330 is automatically transported to a position of the anchor 380 occupied by the chair 155 (see FIG. 1 where the chair 155 is introduced as a furniture item in the presentation space 130), as illustrated by the dashed transition arrow 240 (see FIG. 2 for more details). Simultaneously with immersion of the watch party member 330 into the presentation space 130, the image of the original presenter 110 may be instantly moved to the anchor position 260, which is one of the scenarios explained in FIG. 2 and the accompanying text. The transition of the presenter 110 to a position of the anchor 260 may be part of an original asynchronous presentation or may be a result of additional interactivity offered by the asynchronous presentation and activated by one of the watch party members 330, 340, 350, 360 using, for example, an activation gesture similar to the activation gesture that is used by the presenter 110, which is described in detail elsewhere herein.

It should be noted that, while FIGS. 3A-3B are illustrating the use of anchors during the "deep immersion" from the watch party space 320 into the presentations space 130, the anchors may also be used within the watch party space 320 for quick repositioning of the watch party members 330, 340, 350, 360 (participants).

Figure 4A:
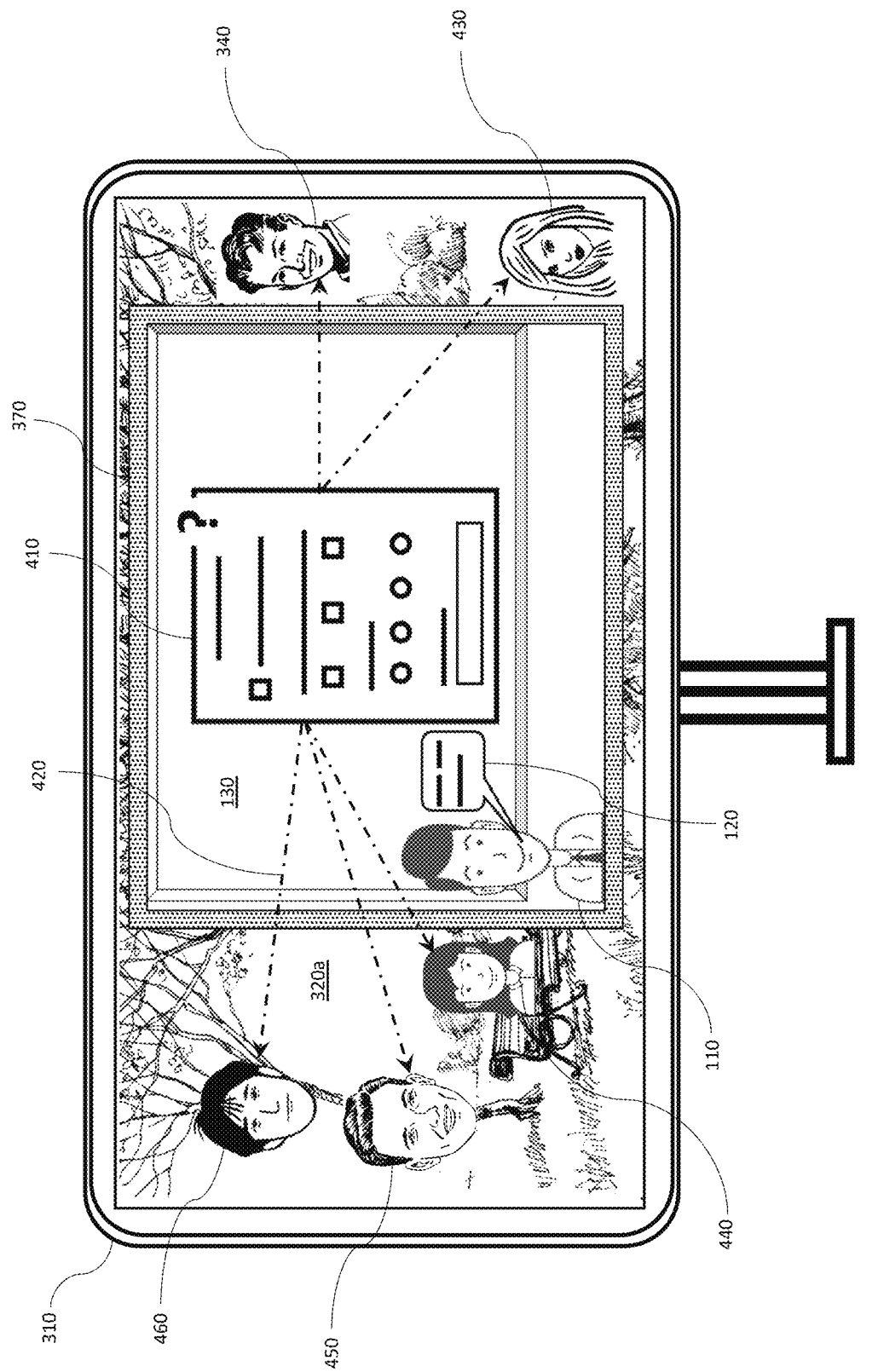
FIGS. 4A-4B are schematic illustrations of displaying an interactive form in an asynchronous video and of selective completion of the form by watch party members (participants), according to an embodiment of the system described herein.
Figure 4B:
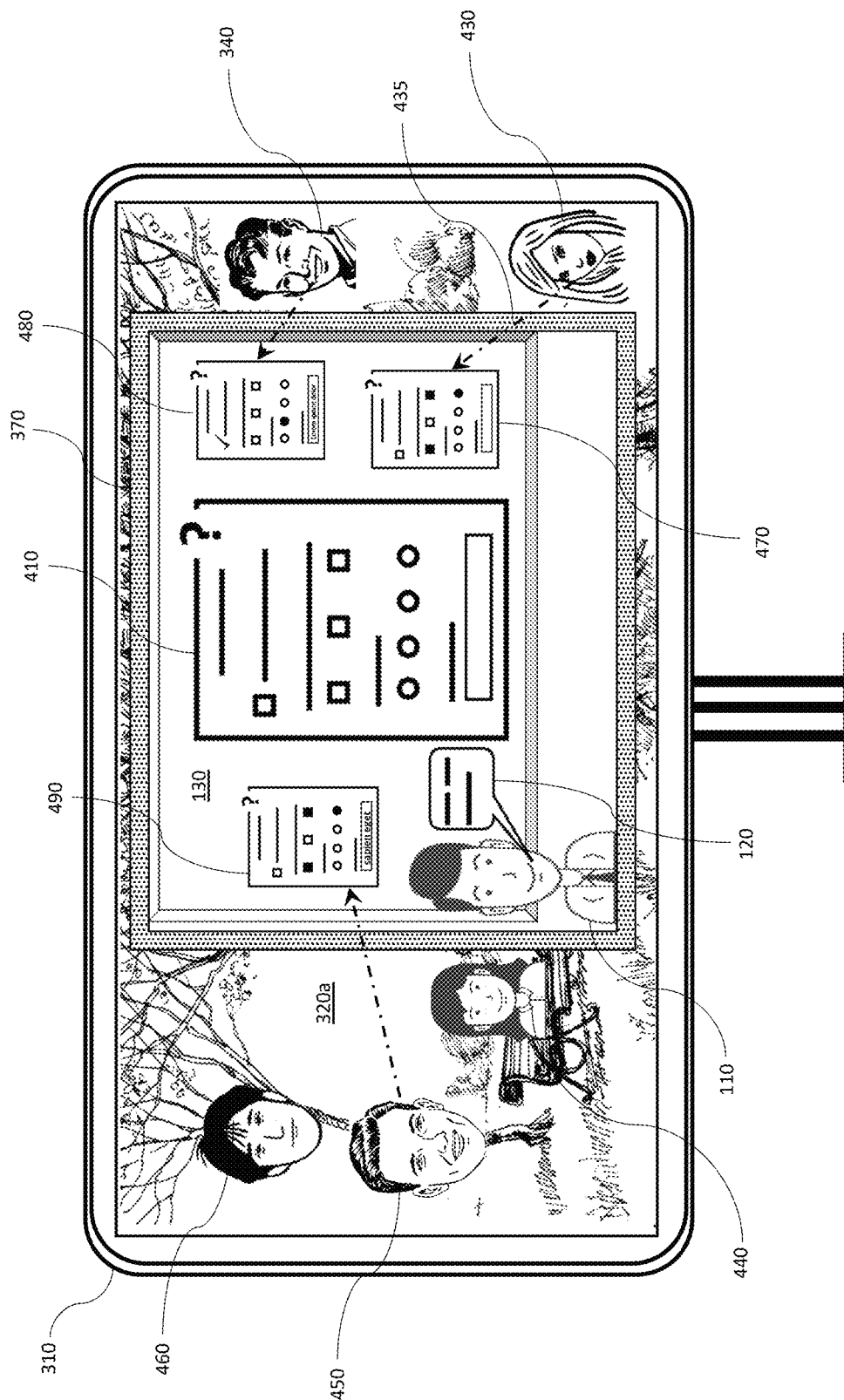

FIGS. 4A-4B are schematic illustrations of displaying an interactive form in an asynchronous video and of selective completion of the form by watch party members (participants).

In FIG. 4A, the screen 310 shows a watch party space 320a, where a watch party is joined by the member 340 (participant) and four other members 430, 440, 450, 460 (participants). The members 340, 430, 440, 450, 460 are watching an asynchronous video content in the pane 370, when the presenter 110 explains (the asynchronous talk 120) and displays in the pane 370 an interactive form 410 and invites the members 340, 430, 440, 450, 460 to complete the form 410, as shown by dash-dotted arrows 420.

FIG. 4B reproduces the watch party and presentation environment of FIG. 4A. Only a portion of the watch party members 340, 430, 440, 450, 460, namely, the members 340, 430, 450 fill in the form 410 and return completed copies 470, 480, 490, as illustrated by arrows 435. The watch party members 440, 460 do not complete the form 410. Note that, in order to enable some of the members of the watch party to be able to manipulate an empty version of the form 410 introduced in an asynchronous presentation replayed at the watch party in the pane 370, the asynchronous video content must possess additional interactivity, as explained elsewhere herein (see item 3(iii) in the Summary section).

Figure 5:
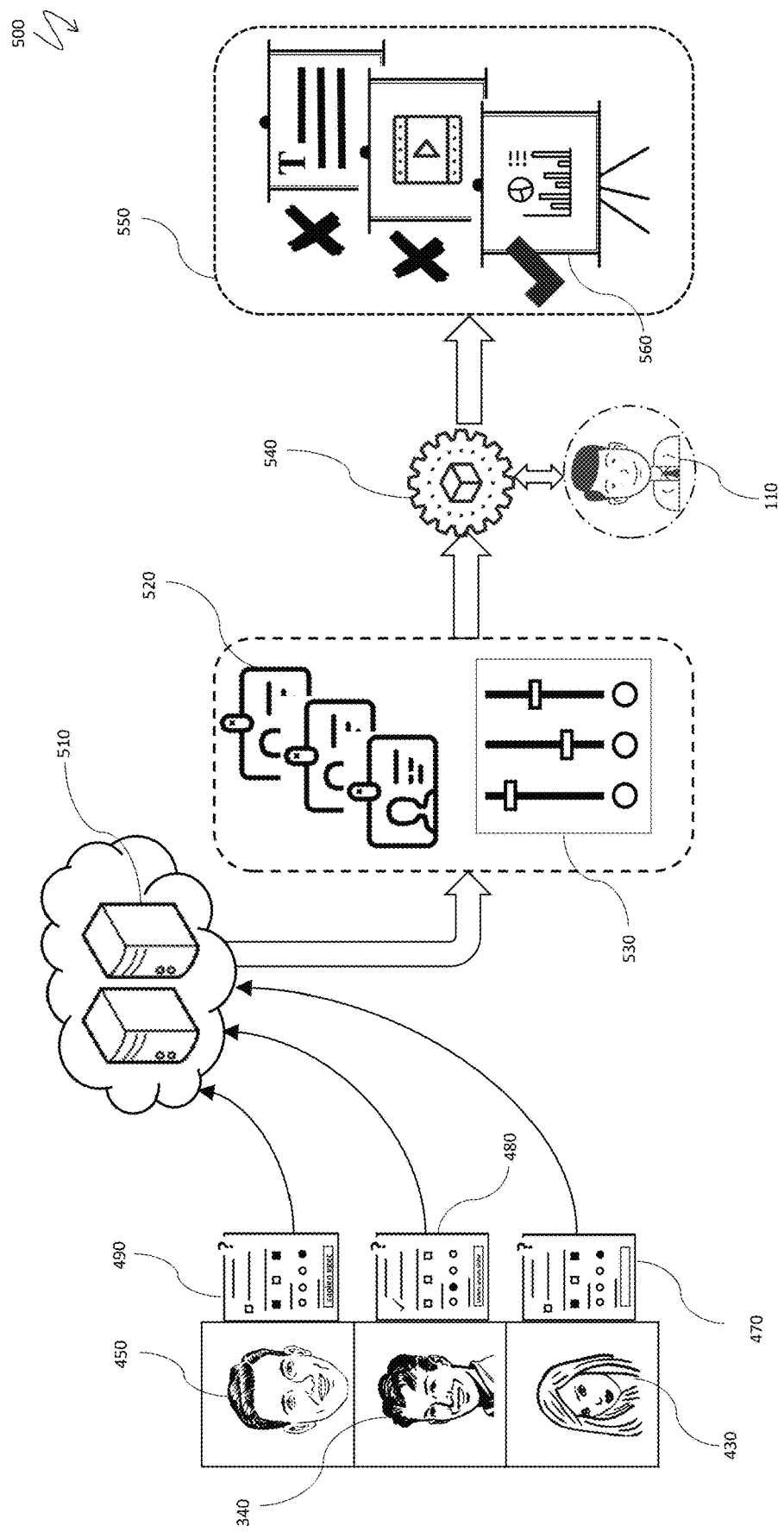
FIG. 5 is a schematic illustration of building and using profiles and preferences of watch party members (participants) based on completed forms, according to an embodiment of the system described herein.

FIG. 5 is a schematic illustration 500 of building and using profiles and preferences of conference participants based on completed forms. In the notations of FIGS. 4A-4B, the watch party members 430, 340, 450 have filled in the form 410 posted by the presenter 110 of the asynchronous presentation and returned the completed copies 470, 480, 490. A forms processing component 510 (shown in FIG. 5 in the cloud installation, although different versions of the component may also be used) processes the completed copies 470, 480, 490 and builds or augments profiles 520 and preferences 530 of the watch party members. Form processing analytics may be delivered to a software component 540 of the asynchronous presentation, implementing another hybrid aspect of interactivity of an asynchronous video content and representing (and replacing) the presenter 110, to provide a choice of altering the course of the presentation or augmenting content of the presentation, as shown by a set 550 of alternative continuations of the presentation and a choice 560 of the software component 540 based on the profiles 520 and the preferences 530 of the watch party members.

Such approach to the dynamic construction of presentations may be especially efficient in situations when the audience changes during the presentation, as may occur during watch parties with many participants, analogous to webinars.

Figure 6:
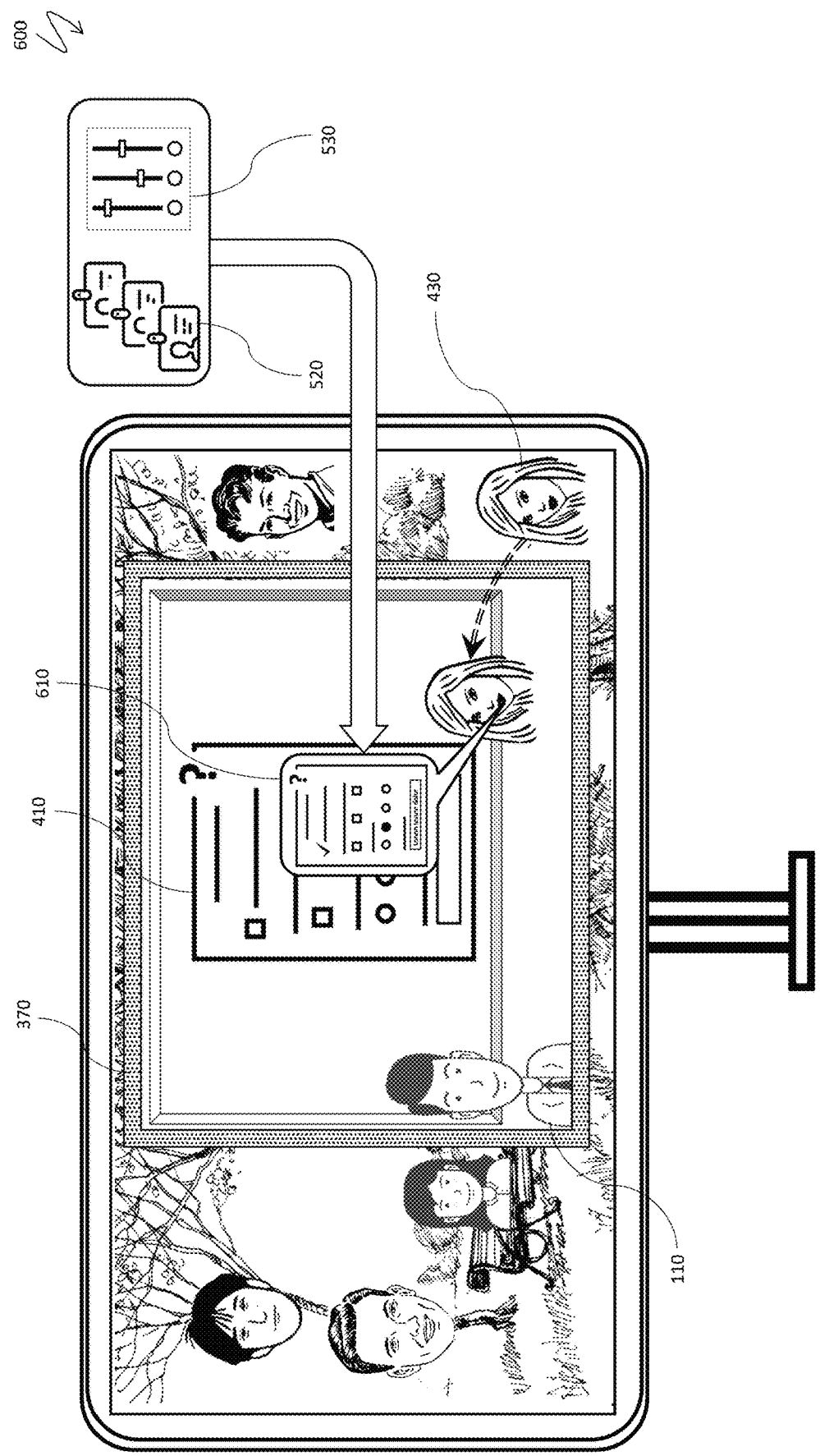
FIG. 6 is a schematic illustration of an immersive watch party member (participant) stopping a presentation to comment on an original and a completed form, according to an embodiment of the system described herein.

FIG. 6 is a schematic illustration 600 of an immersive watch party member stopping a presentation to comment on an original and a completed form. In a watch party environment similar to FIGS. 4A-4B, the watch party member 430 may stop the presentation (the presenter 110 does not talk) and is immersed into the pane 370 to comment both on the original form 410 and on the results of form completion by the watch party members based, among other considerations, on the profiles 520 and the preferences 530, to which the member 430 gains access. FIG. 6 is another illustration of hybrid asynchronous/synchronous video content.

Figure 7:
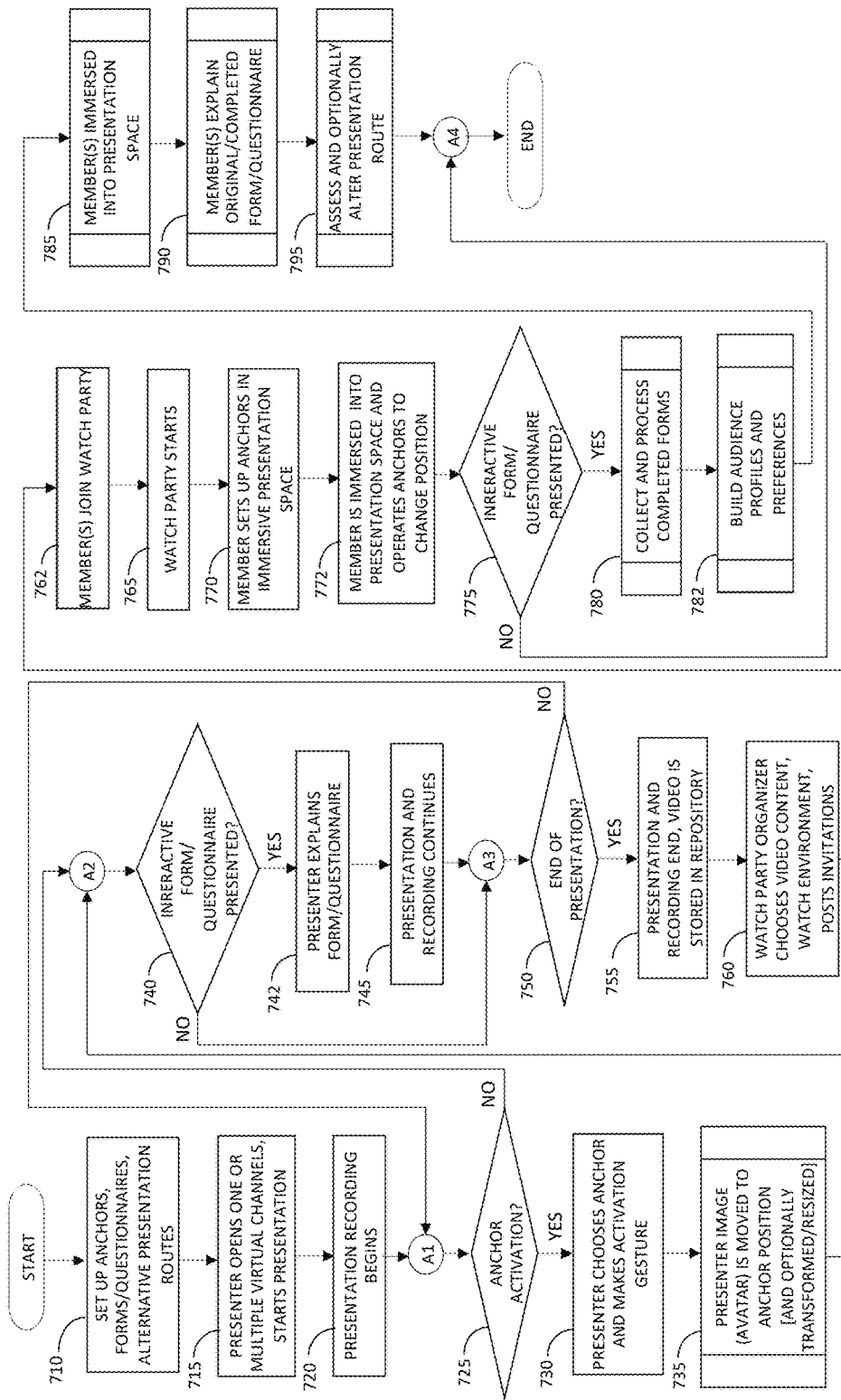
FIG. 7 is a system flow diagram illustrating system functioning in connection with setting up and activating anchors and of immersive form completion for an asynchronous presentation by watch party members (participants), according to an embodiment of the system described herein.

Referring to FIG. 7, a system flow diagram 700 illustrates system functioning in connection with setting up and activating anchors and of immersive form completion for an asynchronous presentation by watch party members. Processing begins at a step 710, where a presenter or other person sets up anchors and prepares forms (questionnaires, quizzes, polls, etc.) prior to starting a recording of an asynchronous presentation. After the step 710, processing proceeds to a step 715, where the presenter opens one or multiple virtual channels in a presentation space (see, for example, FIG. 1) and starts a presentation. After the step 715, processing proceeds to a step 720, where presentation recording begins. After the step 720, processing proceeds to a test step 725, where it is determined whether one of a preset anchors is activated. If so, processing proceeds to a step 730, where the presenter chooses the anchor and makes an activation gesture or chooses another anchor activation method, as explained elsewhere herein. After the step 730, processing proceeds to a step 735, where an image of the presenter (avatar) is moved to the anchor position and may be optionally transformed or resized, as explained, for example, in FIG. 2 and the accompanying text.

After the step 735, processing proceeds to a test step 740, where it is determined whether an interactive form or questionnaire has been presented (note that the test step 740 may be independently reached from the test step 725 if it was determined that no anchor has been activated). If an interactive form/questionnaire has been presented, processing proceeds to a step 742, where the presenter explains the form/questionnaire (see, for example, FIG. 4A and the accompanying text). After the step 742, processing proceeds to a step 745, where the presentation and recording are continued. After the step 745, processing proceeds to a test step 750, where it is determined whether the end of presentation has been reached. (Note that the test step 750 may be independently reached from the test step 740 if it was determined that an interactive object (form, questionnaire, etc.) has not been presented.) If the end of presentation has not been reached, processing proceeds to the test step 725, which may be independently reached from the step 720. Otherwise, processing proceeds to a step 755, where the presentation and recording end and the recorded asynchronous video is stored in a repository. Note that the step 755 completes the creation and storage of an asynchronous video content that may be subsequently viewed by multiple individual and collective users (in particular at watch parties); the remaining steps of FIG. 7 explain the usage of the asynchronous video content at a watch party separately and at a later time than the authoring process explained above.

After the step 755, processing proceeds to a step 760, where a watch party organizer chooses an asynchronous video content, a watch environment, and posts invitations to the watch party. After the step 760, processing proceeds to a step 762, where one or more members join the watch party. After the step 762, processing proceeds to a step 765, where the watch party starts. After the step 765, processing proceeds to a step 770, where a member sets up anchors in the immersive presentations space of the asynchronous video content viewed during the watch party (see FIG. 3A for more information). After the step 770, processing proceeds to a step 772, where the member is immersed into the presentation space of the asynchronous content and operates anchors to change position of the member in the presentation space, as explained in detail in conjunction with FIG. 4B and FIG. 1.

After the step 772, processing proceeds to a test step 775, where it is determined whether an interactive form or a questionnaire has been presented within the asynchronous video content. If not, processing is complete; otherwise, processing proceeds to a step 780, where the completed forms from the watch party members are collected and processed, as explained elsewhere herein (see FIGS. 4A-4B and the accompanying texts for details). After the step 780, processing proceeds to a step 782, where audience profiles and preferences are built by the system, as explained in conjunction with FIG. 5. After the step 782, processing proceeds to a step 785, where one or more watch party members are immersed into the presentation space with the purpose to comment on the forms related system actions. After the step 785, processing proceeds to a step 790, where the immersed member(s) from the previous step 785 stop the presentation at the point where the original form or questionnaire was presented to the audience (the members may rewind the asynchronous presentation back to that point) and explain to the rest of the party the purpose/process/results of presenting and processing the interactive data collection items (form, questionnaire, etc.), as shown in FIG. 6 and described in the accompanying text. Such explanations may be accompanied by a discussion between watch party members. At the end of the step 790, the asynchronous presentation may be resumed. After the step 790, processing proceeds to a step 795, where the outcome of form/questionnaire processing, including user profiles and preferences, are assessed by the system and the presentation route for the asynchronous content may be altered based on the audience feedback, as illustrated in FIG. 5, and explained in the accompanying text. After the step 795, processing is complete.

Various embodiments discussed herein may be combined with each other in appropriate combinations in connection with the system described herein. Additionally, in some instances, the order of steps in the flowcharts, flow diagrams and/or described flow processing may be modified, where appropriate. Subsequently, system configurations may vary from the illustrations presented herein. Further, various aspects of the system described herein may be deployed on various devices, including, but not limited to wearable devices, smartphones, tablets and other mobile computers. Mobile devices may use operating system(s) selected from the group consisting of: IOS, Android OS, Windows Phone OS, Blackberry OS and mobile versions of Linux OS. Certain components of the system may be cloud based and interact with mobile computers.

Software implementations of the system described herein may include executable code that is stored in a computer readable medium and executed by one or more processors. The computer readable medium may be non-transitory and include a computer hard drive, ROM, RAM, flash memory, portable computer storage media such as a CD-ROM, a DVD-ROM, a flash drive, an SD card and/or other drive with, for example, a universal serial bus (USB) interface, and/or any other appropriate tangible or non-transitory computer readable medium or computer memory on which executable code may be stored and executed by a processor. The software may be bundled (pre-loaded), installed from an app store or downloaded from a location of a network operator. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method of manipulating an image in a combined immersive video space for a replayed pre-recorded video being displayed to a plurality of participants, comprising:

associating an anchor to at least one of: a background of the combined immersive video space, static interior objects in the combined immersive video space, or dynamic interior objects in the combined immersive video space;

providing an image corresponding to at least one of: an original presenter in the pre-recorded video, an object in the combined immersive video space, or one of the participants that is viewing pre-recorded video; and actuating an anchor activation control that causes the image to move to a position of the anchor while other ones of the participants are viewing the pre-recorded video, wherein the image moves to the position of the anchor along a transitional route.

2. The method of claim 1, wherein the image changes appearance as the image moves to the position of the anchor along the transitional route.

3. The method of claim 1, wherein the position of the anchor is preset before replaying the pre-recorded video.

4. The method of claim 1, wherein the position of the anchor is created on the fly during replaying the pre-recorded video.

5. The method of claim 1, wherein at least one of the participants actuates the anchor activation control.

6. The method of claim 5, wherein the at least one of the participants actuates the anchor activation control using at least one of: a keyboard shortcut, a click, a voice command, or a touch gesture.

7. The method of claim 6, wherein the touch gesture is at least one of: a tap, a swipe, a tap and hold or an encircling of the anchor.

8. The method of claim 1, wherein the original presenter in the pre-recorded video is moved in response to actuating the anchor activation control.

9. The method of claim 1, wherein at least some of the participants are present in the combined immersive video space.

10. A non-transitory computer readable medium containing software that manipulates an image in a combined immersive video space for a replayed pre-recorded video being displayed to a plurality of participants, the software comprising:

executable code that associates an anchor to at least one of: a background of the combined immersive video space, static interior objects in the combined immersive video space, or dynamic interior objects in the combined immersive video space;

executable code that provides an image corresponding to at least one of: an original presenter in the pre-recorded video, an object in the combined immersive video space, or one of the participants that is viewing pre-recorded video; and executable code that actuates an anchor activation control that causes the image to move to a position of the anchor while other ones of the participants are viewing the pre-recorded video, wherein the image moves to the position of the anchor along a transitional route.

11. The non-transitory computer readable medium of claim 10, wherein the image changes appearance as the image moves to the position of the anchor along the transitional route.

12. The non-transitory computer readable medium of claim 10, wherein the position of the anchor is preset before replaying the pre-recorded video.

13. The non-transitory computer readable medium of claim 10, wherein the position of the anchor is created on the fly during replaying the pre-recorded video.

14. The non-transitory computer readable medium of claim 10, wherein at least one of the participants actuates the anchor activation control.

15. The non-transitory computer readable medium of claim 14, wherein the at least one of the participants actuates the anchor activation control using at least one of: a keyboard shortcut, a click, a voice command, or a touch gesture.

16. The non-transitory computer readable medium of claim 15, wherein the touch gesture is at least one of: a tap, a swipe, a tap and hold or an encircling of the anchor.

17. The non-transitory computer readable medium of claim 10, wherein the original presenter in the pre-recorded video is moved in response to actuating the anchor activation control.

18. The non-transitory computer readable medium of claim 10, wherein at least some of the participants are present in the combined immersive video space.

* * * * *